US012231707B2

(12) United States Patent
Lo et al.

(10) Patent No.: US 12,231,707 B2
(45) Date of Patent: Feb. 18, 2025

(54) TERMINAL, METHOD, AND SERVER FOR PROVIDING E-COMMERCE USING LIVE-STREAMS

(71) Applicant: 17LIVE Japan Inc., Tokyo (JP)

(72) Inventors: Hao-Jung Lo, Taipei (TW); Sheng-Kai Hsu, Taipei (TW); Chia-Yi Yang, Taipei (TW)

(73) Assignee: 17LIVE Japan Inc., Tokyo (JP)

( * ) Notice: Subject to any disclaimer, the term of this patent is extended or adjusted under 35 U.S.C. 154(b) by 0 days.

(21) Appl. No.: 18/331,726

(22) Filed: Jun. 8, 2023

(65) Prior Publication Data
US 2024/0056620 A1 Feb. 15, 2024

(30) Foreign Application Priority Data

Aug. 15, 2022 (JP) ................. 2022-129207

(51) Int. Cl.
*H04N 5/445* (2011.01)
*G06F 3/00* (2006.01)
(Continued)

(52) U.S. Cl.
CPC ..... *H04N 21/2542* (2013.01); *H04N 21/2187* (2013.01); *H04N 21/47217* (2013.01); *H04N 21/47815* (2013.01); *H04N 21/4788* (2013.01)

(58) Field of Classification Search
CPC ........... H04N 21/2542; H04N 21/2187; H04N 21/47217; H04N 21/47815; H04N 21/4788
See application file for complete search history.

(56) References Cited

U.S. PATENT DOCUMENTS

2016/0381427 A1* 12/2016 Taylor .................. H04N 21/472
725/13
2019/0287139 A1* 9/2019 Yadav .................. G11B 27/034
(Continued)

FOREIGN PATENT DOCUMENTS

JP 2019-109785 A 7/2019
WO 2021/106034 A1 6/2021

OTHER PUBLICATIONS

Notification of Reasons for Refusal dated Nov. 18, 2022, issued in corresponding Japanese Patent Application No. 2022-129207 with English translation.
(Continued)

*Primary Examiner* — Gigi L Dubasky
(74) *Attorney, Agent, or Firm* — Pillsbury Winthrop Shaw Pittman, LLP

(57) ABSTRACT

Provided is a terminal including one or more processors and memory storing one or more computer programs configured to be executed by the one or more processors. The one or more computer programs including instructions for: displaying an edit screen on a display, the edit screen including a first area that displays a video obtained by playing back an archive of a live-stream associated with a plurality of selling items, an object that indicates a current playback position of the video, and a second area that selectably displays the plurality of selling items associated with the live-stream; and communicating with a server over a network so that a result of edits made through the edit screen is associated with a selling item selected in the second area.

6 Claims, 11 Drawing Sheets

(51) Int. Cl.
*G06F 13/00* (2006.01)
*H04N 21/2187* (2011.01)
*H04N 21/254* (2011.01)
*H04N 21/472* (2011.01)
*H04N 21/478* (2011.01)
*H04N 21/4788* (2011.01)

(56) References Cited

U.S. PATENT DOCUMENTS

2022/0067993 A1* 3/2022 Li .................... G06Q 30/0207
2022/0383394 A1* 12/2022 Anerella ............ H04N 21/2187

OTHER PUBLICATIONS

Notification of Reasons for Refusal dated Mar. 23, 2023, issued in corresponding Japanese Patent Application No. 2022-129207 with English translation.
HandsUp by 17Live, 17Live Concept of Live Commence, with English translation (28 pgs.). https://handsup.17.live/live-commerce/.

* cited by examiner

| Archive ID | Stream ID | Live-stream Start Time | Length | Selling Item ID | Archive Data | Comment Data | | Likes Data | Viewers Data | Cart Data |
|---|---|---|---|---|---|---|---|---|---|---|
| AR01 | ST01 | 2022/5/2 12:58 | 45 min | PD001 | ... | 12:59 | "That hat is beautiful!" | 13:01 +1 | 12:58 +3 | 13:06 PD001 1 |
| | | | | PD002 | | | | 13:03 +1 | 13:01 +2 | 13:14 PD001 2 |
| | | | | PD003 | | 13:05 | "The hat looks great on you." | ... | 13:05 −1 | ... |
| | | | | | | ... | | | | |

| Archive ID | Time-series Data of Number of Comments | Time-series Data of Number of Likes | Time-series Data of Number of Viewers | Selling Item ID | Time-series Data of Number of Selling Item | Time-series Data of Number of Related Comments |
|---|---|---|---|---|---|---|
| AR01 | 0-31, 3-60, 6-93 | 0-31, 3-61, 6-92 | 0-33, 3-65, 6-94 | PD001 | 0-30, 3-60, 6-91, ... | 0-31, 3-60, 6-91, ... |
| | | | | PD002 | ... | ... |
| | | | | PD003 | ... | ... |

TERMINAL, METHOD, AND SERVER FOR PROVIDING E-COMMERCE USING LIVE-STREAMS

CROSS-REFERENCE TO RELATED APPLICATIONS

This application is based on and claims the benefit of priority from Japanese Patent Application Serial No. 2022-129207 (filed on Aug. 15, 2022), the contents of which are hereby incorporated by reference in its entirety.

TECHNICAL FIELD

The present disclosure relates to a terminal, a method, and a server.

BACKGROUND

Live commerce (LC) is a new customer service and sales approach combining live-streams and e-commerce (EC). It can provide users with a purchasing experience similar to that in a physical store, regardless of where the users are (see, for example, International Publication No. WO 2021/106034 ("the '034 Publication"), Japanese Patent Application Publication No. 2019-109785 ("the '785 Publication"), and "What is Live Commerce?", HandsUP, URL: https://handsup.17.live/live-commerce/("Non-patent literature 1").

The inventors have discovered the following issues regarding the live commerce through their own investigation.

In the live commerce, not only viewers purchase goods and services during a live-stream, but also viewers who view the archive of the live-stream later also purchase goods and services. Since the sales volume of goods and services through archived live-streams is relatively large, archiving is one of the most important commercial tools for live commerce providers. Therefore, the emergence of video editing technology suitable for live commerce archives is desired.

SUMMARY

In view of the above, one object of the present disclosure is to provide a video editing technology suitable for live commerce archives.

One aspect of the disclosure relates to a terminal. The terminal includes one or more processors and memory storing one or more computer programs configured to be executed by the one or more processors. The one or more computer programs including instructions for: displaying an edit screen on a display, the edit screen including a first area that displays a video obtained by playing back an archive of a live-stream associated with a plurality of selling items, an object that indicates a current playback position of the video, and a second area that selectably displays the plurality of selling items associated with the live-stream; and communicating with a server over a network so that a result of edits made through the edit screen is associated with a selling item selected in the second area.

Another aspect of the present disclosure relates to a server. The server includes: a transmitting unit adapted to transmit an archive of a live-stream associated with a plurality of selling items to an editing terminal over a network; a receiving unit adapted to receive, from the editing terminal over the network, a result of edits made at the editing terminal and a selling item selected from among the plurality of selling items associated with the live-stream; a processing unit adapted to process the archive of the live-stream based on the received result of edits; and an associating unit adapted to associate the processed archive with the selected selling item.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

BRIEF DESCRIPTION OF THE DRAWINGS

FIG. 4 is a data structure diagram of an example of an archive DB in FIG. 3.

FIG. 5 is a data structure diagram showing an example of a time-series data DB in FIG. 3.

DESCRIPTION OF THE EMBODIMENTS

Like elements, components, processes, and signals throughout the figures are labeled with same or similar designations and numbering, and the description for the like elements will not be hereunder repeated. For purposes of clarity and brevity, some of the components that are less related and thus not described are not shown in the figures.

In a live commerce system of an embodiment, when editing an archive of a live-stream (hereinafter referred to as "LC live-stream") performed to sell goods and/or services (hereinafter referred to simply as "selling items"), the system allows an editor to select a desired selling item(s) from among a plurality of items showcased in the LC live-stream. Upon selection of a selling item, temporal variation of a parameter(s) related to the selected selling item is displayed on an edit screen of the editor's editing terminal such that it corresponds to a progress bar indicating a current playback position of an archive. This allows the editor to more easily find the correspondence between each selling item to an edited video when editing the archive of the LC live-stream in which multiple selling items are sold. In addition, by viewing the temporal variation of the parameter, the editor can more quickly locate the portion of the entire archive that relates to the selected selling item.

Figure 1:
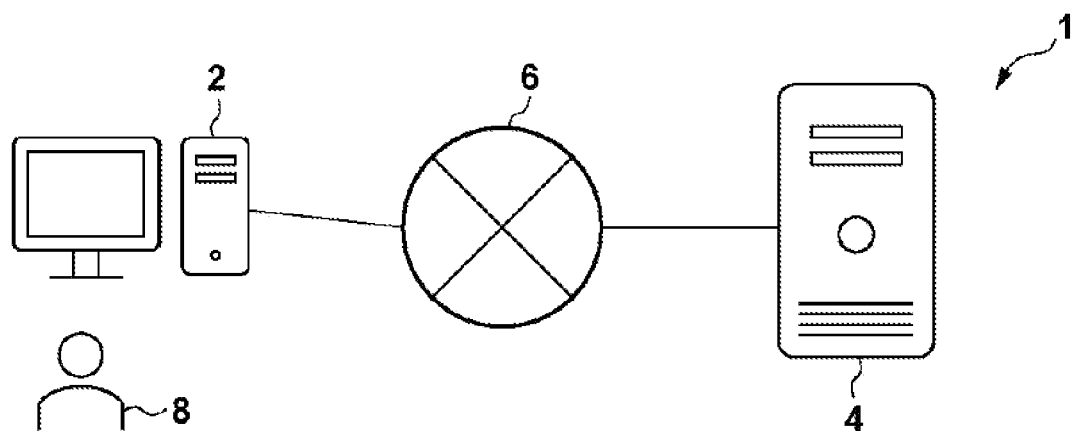
FIG. 1 schematically illustrates a configuration of a live commerce system in one embodiment of the disclosure.

FIG. 1 schematically illustrates a configuration of a live commerce system 1 in one embodiment of the disclosure. The live commerce system 1 includes an editing terminal 2 used by an editor 8 and a live commerce (LC) server 4. The LC server 4 may be implemented as one or more information processing devices connected to a network 6. The editing terminal 2 may be, for example, mobile terminal devices such as smartphones, tablets, laptop PCs, recorders, portable gaming devices, and wearable devices, or may be stationary devices such as desktop PCs. The LC server 4 and the editing terminal 2 are communicably interconnected over the network 6.

The LC server 4 hosts an LC live-stream provided by the editor 8 or other streamer. The LC server 4 holds video data of the LC live-stream that has been performed as an archive. The editor 8 operates the editing terminal 2 to access the LC server 4 and edits the archive to create an edited video. The edited video is, for example, a clip video made by cutting out a portion of the archive or a chaptered video that can be played back by chapter by adding chapter information to the archive. The case where the edited video is the clip video will be described below, but it is understood by those skilled in the art that the technical concept of the embodiment can be applied to chaptered videos and other types of edited videos.

As used herein, the term "live-streaming" or "live-stream" may mean a mode of data transmission that allows a content recorded at a user terminal of a streamer to be played and viewed at user terminals of viewers substantially in real time, or it may mean a live broadcast realized by such a mode of transmission. The live-streaming may be achieved using existing live-streaming technologies such as HTTP Live Streaming, Common Media Application Format, Web Real-Time Communications, Real-Time Messaging Protocol and MPEG DASH. The live-streaming includes a transmission mode in which, while a streamer is recording contents, viewers can view the contents with a certain delay. The delay is acceptable as long as interaction between the streamer and the viewers can be at least established.

The term "video data" herein refers to data that includes image data (also referred to as moving image data) generated using an image capturing function of a user terminal and audio data generated using an audio input function of the user terminal. Video data is reproduced in user terminals, so that the users can view the contents.

Figure 2:
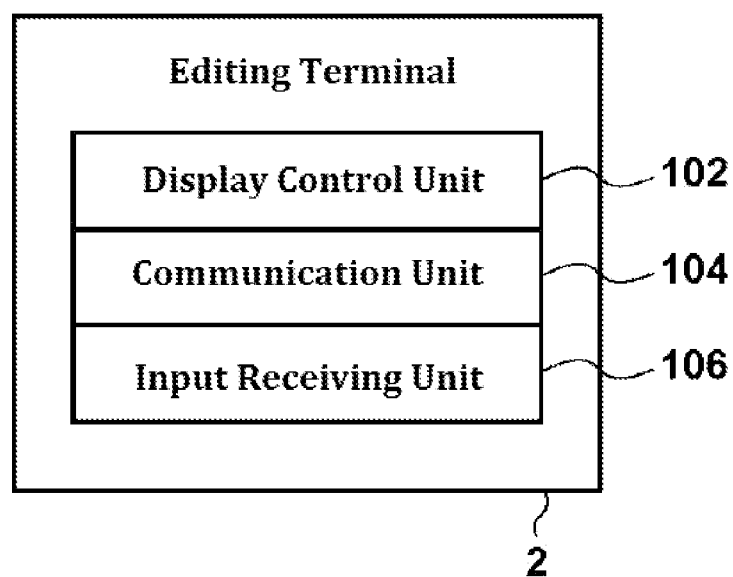
FIG. 2 is a block diagram showing functions and configuration of an editing terminal shown in FIG. 1.

FIG. 2 is a block diagram showing functions and configuration of the editing terminal 2 shown in FIG. 1. The blocks in FIG. 2 and the subsequent block diagrams may be realized by elements such as a computer CPU or a mechanical device in terms of hardware, and can be realized by a computer program or the like in terms of software. The blocks shown in the drawings are, however, functional blocks realized by cooperative operation between hardware and software. Therefore, it is understood by those skilled in the art that these functional blocks can be realized in various forms by combining hardware and software.

The editor 8 downloads and installs an application program (hereinafter referred to as an editing application), onto the editing terminal 2 from a download site over the network 6. Alternatively, the editing application may be pre-installed on the editing terminal 2. When the editing application is executed on the user terminal 2, the user terminal 2 communicates with the LC server 4 over the network 6 to implement various functions. Hereinafter, the functions implemented by (processors such as a CPU of) the editing terminal 2 by running the editing application will be described as functions of the user terminal 2. These functions are realized in practice by the editing application on the editing terminal 2. In any other embodiments, these functions may be realized by a computer program that is written in a programming language such as HTML (HyperText Markup Language), transmitted from the LC server 4 to a web browser of the editing terminal 2 over the network NW, and executed by the web browser.

The editing terminal 2 includes a display control unit 102, a communication unit 104, and an input receiving unit 106. The display control unit 102 generates various screens and displays them on a display of the editing terminal 2. The display control unit 102 updates contents of the screen shown on the display. The communication unit 104 communicates with the LC server 4 over the network 6. The communication unit 104 generates various processing requests and signals and transmits them to the LC server 4 over the network 6. The communication unit 104 receives requests and signals that have be transmitted by the LC server 4 over the network 6 to the editing terminal 2. The communication unit 104 receives responses from the LC server 4 to the requests and signals that have been transmitted by the communication unit 104 over the network 6. The input receiving unit 106 accepts inputs by the editor 8 via input means such as a mouse, keyboard, or touch panel.

Figure 3:
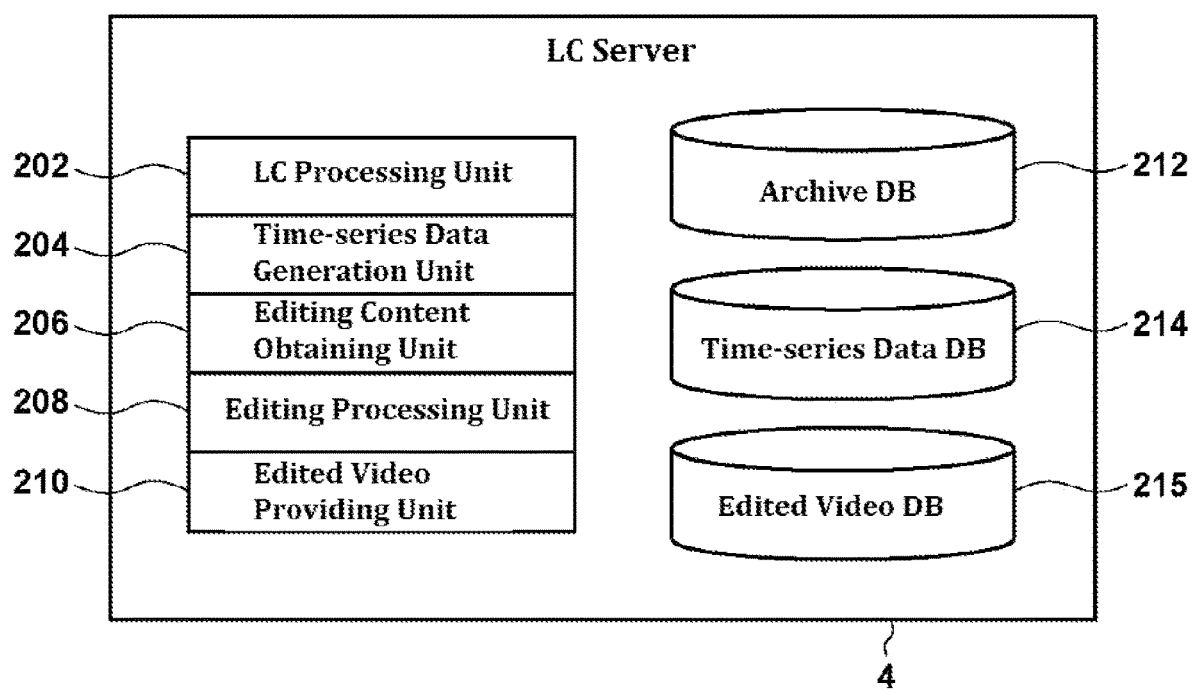
FIG. 3 is a block diagram showing functions and configuration of an LC server shown in FIG. 1.

FIG. 3 is a block diagram showing functions and configuration of the LC server 4 shown in FIG. 1. The LC server 4 includes an LC processing unit 202, a time-series data generation unit 204, an editing content obtaining unit 206, an editing processing unit 208, an edited video providing unit 210, an archive DB 212, a time-series data DB 214, and an edited video DB 215.

The LC processing unit 202 performs processing for hosting an LC live-stream. Hosting of an LC live-stream performed through the LC processing unit 202 may be realized using known techniques described in, for example, the '034 Publication, the '785 Publication, and Non-patent literature 1. The LC live-stream is herein one type of live-streams. In the LC live-stream, data of the live-stream is combined or associated with data of selling item(s) that are sold in the live-stream. For example, in the LC live-stream, the streamer first specifies selling items before starting the LC live-stream. The LC live-stream screen includes an object for placing a selling item in a cart.

To establish an LC live-stream, it is not enough that the streamer merely showcases specific products or services in the live-stream, but it is necessary that data of the live-stream is associated with data of the selling items in the server or live-streaming platform that hosts the live-stream. Therefore, the archive of the LC live-stream is automatically assigned the information of the selling items.

The LC processing unit 202 registers the archive of the LC live-stream hosted in the archive DB 212, along with comments and likes made in the LC live-stream and cart information about the selling items.

FIG. 4 is a data structure diagram of an example of the archive DB 212 in FIG. 3. The archive DB 212 holds archives of past LC live-streams and related information. The archive DB 212 holds archive IDs for identifying the archives, stream IDs for identifying archived LC live-streams, the start time and length of each of the archived LC live-streams, selling item IDs for identifying selling items associated with the archived LC live-stream, video data of the archives, data of comments entered by viewers and streamers in each of the archived LC live-streams, data of likes made by viewers in each of the archived LC live-streams, data of viewers of each of the archived LC live-streams, and data of selling items in the cart in each of the archived LC live-streams. The cart data indicates when, which selling items, and how many, were placed in the cart by viewers in the LC live-stream. In the example of FIG. 4, the archive DB holds the cart data indicating that one piece of selling item "PD001" was placed in the cart at 13:06 and two pieces of selling item "PD001" were placed in the cart at 13:14 in the LC live-stream "ST01".

Referring again to FIG. 3, the time-series data generating unit 204 generates respective time-series data by processing the comment data, like data, viewer data, and cart data of a previous LC live-stream. The time-series data generating unit 204 registers the generated time-series data in the time-series data DB 214.

FIG. 5 is a data structure diagram showing an example of the time-series data DB 214 in FIG. 3. The time-series data DB 214 holds archive IDs for identifying the archives, time-series data of the number of comments in each of the archived LC live-streams, time-series data of the number of likes in each of the archived LC live-streams, time-series data of the number of viewers in each of the archived LC live-streams, and time-series data for each selling item, in association with each other. The time-series data of the number of comments is generated by dividing the archive into segments of a predetermined time (e.g., 3 minutes) and counting the number of comments in each segment. In the example of FIG. 5, for the archive "AR01," the time-series data of the number of comments is held as follows: "1" for the segment from the start (0 minutes) to 3 minutes, "0" for the segment from 3 minutes to 6 minutes, and "3" for the segment from 6 minutes to 9 minutes. The time-series data of the number of likes and the number of viewers are generated in the same way by counting the number of likes and the number of viewers in each segment, respectively.

The time-series data for each selling item includes, for each selling item associated with an archived LC live-stream, selling item ID of the selling item, time-series data of the number of the selling item placed in the cart in the archived LC live-stream, and time-series data of the number of comments related to the selling item in the archived LC live-stream. The number of the selling item in the cart indicates the number of pieces placed in the cart for the selling item. The time-series data of the number of the selling item in the cart is generated by dividing the archive into segments of a predetermined time (e.g., 3 minutes) and counting the number of the selling item in the cart in each segment. In the example of FIG. 5, the time-series data of the number of the selling item "PD001" in the cart in the archive "AR01" is held as follows: "0" for the segment from the start (0 minutes) to 3 minutes, "0" for the segment from 3 minutes to 6 minutes, and "1" for the segment from 6 minutes to 9 minutes.

The time-series data generating unit 204 analyzes each comment in the archived LC live-stream to determine whether the comment is about which selling item or is not related to any selling items. For example, the time-series data generating unit 204 sets a keyword(s) for each selling item that characterizes the item. The keywords may be, for example, words that describe the name, function, efficacy, type, attributes, etc. of the selling item. The time-series data generating unit 204 calculates the degree of matching between the keywords of the selling item and each comment. The time-series data generating unit 204 determines that a comment is not related to any of the selling items when the calculated degree of matching is less than a threshold value for any of the selling items. When the calculated degree of matching for any selling items is greater than the threshold, the time-series data generating unit 204 identifies the selling item with the greatest degree of matching. The time-series data generating unit 204 determines that comment as the relevant comment for the identified selling item.

The time-series data of the number of comments related to the selling item is generated by dividing the archive into segments of a predetermined time (e.g., 3 minutes) and counting the number of comments related to the selling item in each segment. In the example of FIG. 5, for the selling item "PD001" in the archive "AR01," the time-series data of the number of related comments is held as follows: "1" for the segment from the start (0 minutes) to 3 minutes, "0" for the segment from 3 minutes to 6 minutes, and "1" for the segment from 6 minutes to 9 minutes.

Referring again to FIG. 3, the editing content obtaining unit 206 receives an archive edit request from the editing terminal 2 over the network 6. The edit request includes the archive ID of the archive to be edited specified by the editor 8. The editing content obtaining unit 206 obtains the data of the archive specified in the received edit request, the start time and the length of the live-stream, and the selling item IDs, from the archive DB 212. The editing content obtaining unit 206 obtains, for the archive specified in the received edit request, the time-series data of the number of comments, the time-series data of the number of likes, the time-series data of the number of viewers, and the time-series data for each selling item, from the time-series data DB 214. The time-series data for each selling item includes the selling item ID, the time-series data of the number of the selling item in the cart, and the time-series data of the number of the related comments. The editing content obtaining unit 206 transmits the obtained data to the requesting editing terminal 2 over the network 6. The editing content obtaining unit 206 receives, from the editing terminal 2, edits on the archive performed at the editing terminal 2 and the selling items selected from among the plurality of selling items over the network 6.

The editing processing unit 208 processes the archive based on an editing result received by the edited contents obtaining unit 206. When editing is performed to generate a clip video, the editing result includes the start time, end time, and title. The editing processing unit 208 cuts out from the archive the segment between the start time and the end time. The editing processing unit 208 generates a clip video by associating the title with the segment cut out.

The editing processing unit 208 associates the processed archive with the selected selling item(s). The editing processing unit 208 registers the archive that has been processed based on the result of the edits and associated with the selling item as an edited video in the edited video DB 215. In the above clip video example, the editing processing unit 208 generates the edited clip video by processing the data of the clip video so that an icon of the selected selling item is superimposed on the generated clip video.

When the edited video providing unit 210 receives a request to view an edited video from a user terminal of any user, it retrieves the requested edited video from the edited video DB 215 and transmits it to the requesting user terminal over the network 6.

Figure 6:
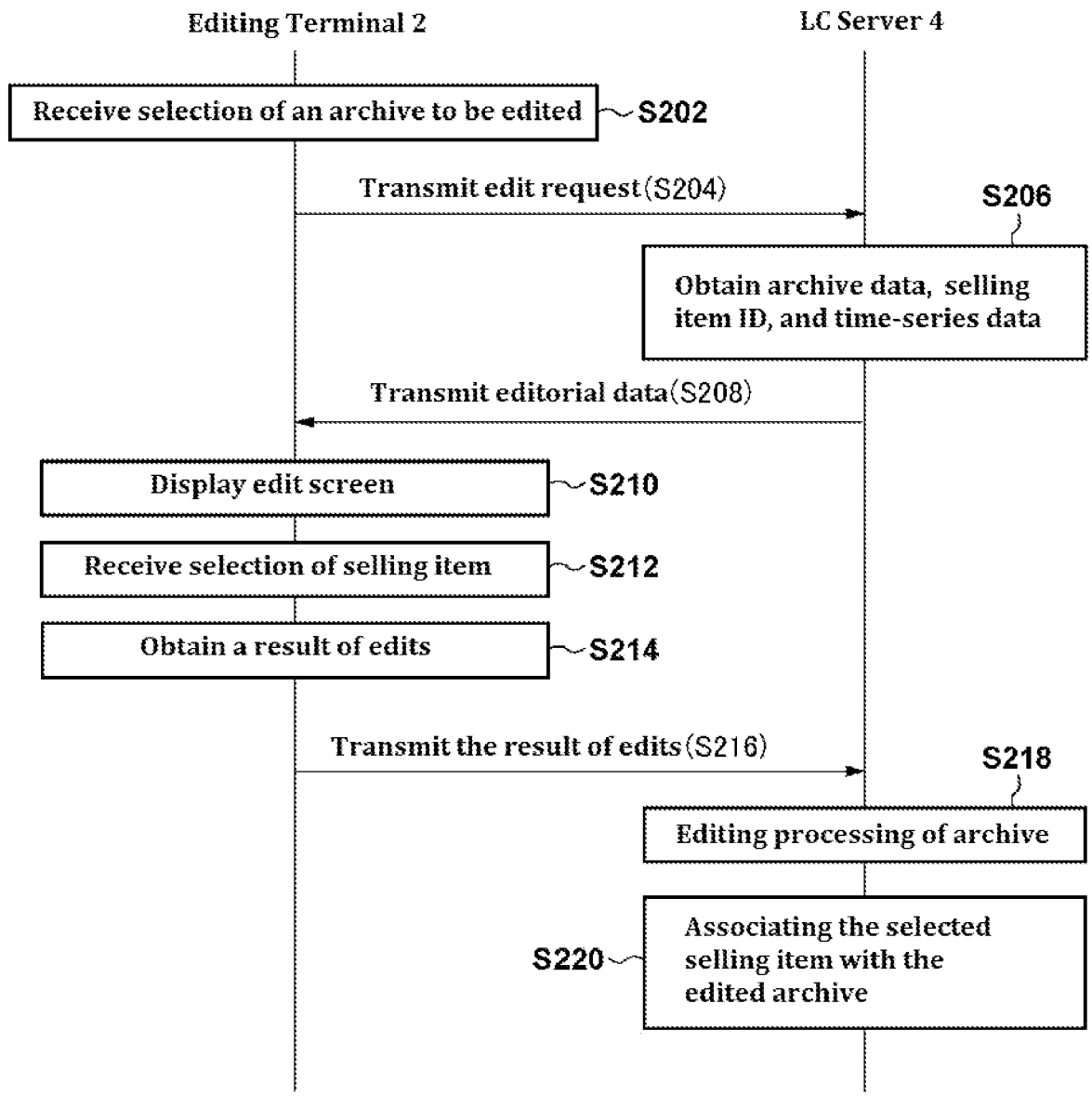
FIG. 6 is a flow chart of processes performed in the live commerce system when editing an archive of an LC live-stream.

The operation of the live commerce system 1 with the above configuration will be now described. FIG. 6 is a flow chart of processes performed in the live commerce system 1 when editing an archive of an LC live-stream. The input receiving unit 106 of the editing terminal 2 receives a selection of an archive to be edited by the editor 8 (S202). The input receiving unit 106 obtains the archive corresponding to the thumbnail selected by the editor 8 through the input means as the archive to be edited from among a plurality of thumbnails of the archives displayed on the display by the display control unit 102. The communication unit 104 generates the edit request including the archive ID of the archive specified in step S202 and transmits it to the LC server 4 over the network 6 (S204).

Once the editing content obtaining unit 206 of the LC server 4 receives the edit request sent in step S204, it obtains the archive data corresponding to the archive ID included in the edit request, the selling item ID, the time series data, and other information from the archive DB 212 and the time series data DB 214 (S206). The editing content obtaining unit 206 transmits the data for editing including the data acquired in step S206 to the requesting editing terminal 2 over the network 6 (S208).

The display control unit 102 of the editing terminal 2 generates an edit screen, which will be later described, based on the received editorial data and displays the screen on the display (S210). The input receiving unit 106 accepts selection of a selling item by the editor 8 on the edit screen displayed (S212). The input receiving unit 106 receives inputs made by the editor 8 on the displayed edit screen to obtain a result of edits (S214). The communication unit 104 communicates with the LC server 4 over the network 6 so that the result of edits made through the edit screen in step S214 is associated with the selling item selected in step S212 (S216). The communication unit 104 generates edit result data that holds the result of edits obtained in step S214 and the selling item ID of the selling item selected in step S212 in association with each other, and transmits the edit result data to the LC server 4 over the network 6.

Once the editing processing unit 208 of the LC server 4 receives the edit result data transmitted in step S216, it performs editing processing of the archive based on the edits contained in the edit result data (S218). The editing processing unit 208 generates an edited video by associating the selling item ID(s) included in the edit result data with the archive edited and processed in step S218 (S220). The editing processing unit 208 stores the generated edited video in the edited video DB 215.

Figure 7:
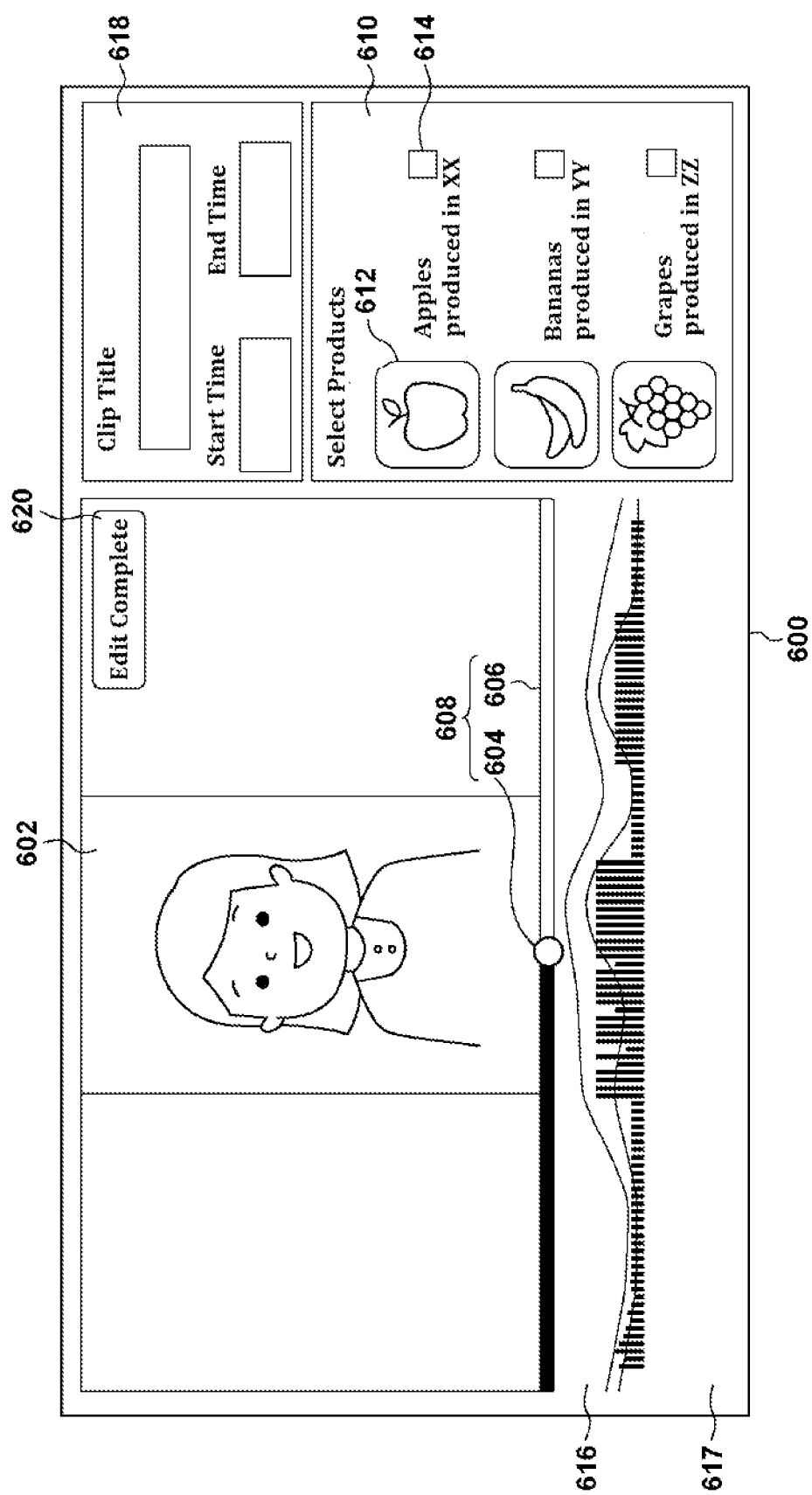
FIG. 7 is a representative view of an edit screen shown on a display of the editing terminal when no selling items have been selected.

FIG. 7 is a representative view of an edit screen 600 shown on the display of the editing terminal 2 when no selling items have been selected. The edit screen 600 includes an archive playback area 602 that displays a video by playing back an archive of an LC live-stream associated with a plurality of selling items, a progress bar 608 that indicates the current playback position of the video being played in the archive playback area 602, and a product selection area 610 that displays the plurality of selling items associated with the LC live-stream for selection. The editing screen 600 also includes a first time variation display area 616 and a second time variation display area 617 that are displayed in association with the progress bar 608, an information input area 618 that accepts input of information about an edited video, and an edit complete button 620. The first and second time variation display areas 616 and 617 respectively display the temporal variation of the parameter related to the LC live streaming.

The display control unit 102 reproduces the archive contained in the editorial data received from the LC server 4 and displays the resulting video in the archive playback area 602. At the same time, the display control unit 102 updates the display of the progress bar 608 to indicate the current playback position of the video. The progress bar 608 includes a thumb object 604 and a bar object 606. The bar object 606 represents the entire length of the video by its total length. The position of the thumb object 604 on the bar object 606 indicates the current playback position.

The product selection area 610 displays, for each of the plurality of selling items identified by the selling item IDs included in the editorial data, the corresponding product icon 612, name, and checkbox 614 for that selling item. In the example of FIG. 7, three selling items, apples produced in XX, bananas produced in XX, and grapes produced in ZZ, are associated with the LC live-stream, and the respective product icons, names and checkboxes are displayed. By clicking or tapping the check box 614 in the product selection area 610, the corresponding selling item can be selected. When the input receiving unit 106 detects a click or tap on the check box 614 in the product selection area 610, it specifies the corresponding selling item as the selected selling item. In the example of FIG. 7, no selling target is selected in the product selection area 610.

The length of the first time variation display area 616 corresponds to or is same as the total length of the progress bar 608. The bar object 606 of the progress bar 608 represents the time axis of the first time variation display area 616. The length of the second time variation display area 617 corresponds to or is same as the total length of the progress bar 608. The bar object 606 of the progress bar 608 represents to the time axis of the second time variation display area 617.

The first time variation display area 616 displays the time variation of parameters independent of selling items. The first time variation display area 616 displays the time variation of the number of comments based on the time-series data of the number of comments included in the editorial data in the form of a line or bar chart. The first time variation display area 616 displays the time variation of the number of likes based on the time-series data of the number of likes included in the editorial data in the form of a line or bar chart. The first time variation display area 616 displays the time variation of the number of viewers based on the time-series data of the number of viewers included in the editorial data in the form of a line or bar chart. In the first time variation display area 616, the number of comments, the number of likes, and the number of viewers are overlaid in different display formats. The first time variation display area 616 displays the time variations of the number of comments, the number of likes, and the number of viewers both when no selling item is selected in the product selection area 610 (the state shown in FIG. 7) and when a selling item has been selected in the product selection area 610 (the state shown in FIG. 8). Whether selection has been made in the product selection area 610 does not affect the display content of the first time variation display area 616.

The second time variation display area 617 displays the time variation of a parameter related to the selling item selected in the product selection area 610. The contents displayed in the second time variation display area 617 differ for different selling items selected in the product selection area 610. In the example of FIG. 7, since no selling item is selected in the product selection area 610, nothing is displayed in the second time variation display area 617.

The information input area 618 includes an area for accepting input of a title of an edited video, a start time input area for accepting input of the start time, and an end time input area for accepting input of the end time.

Figure 8:
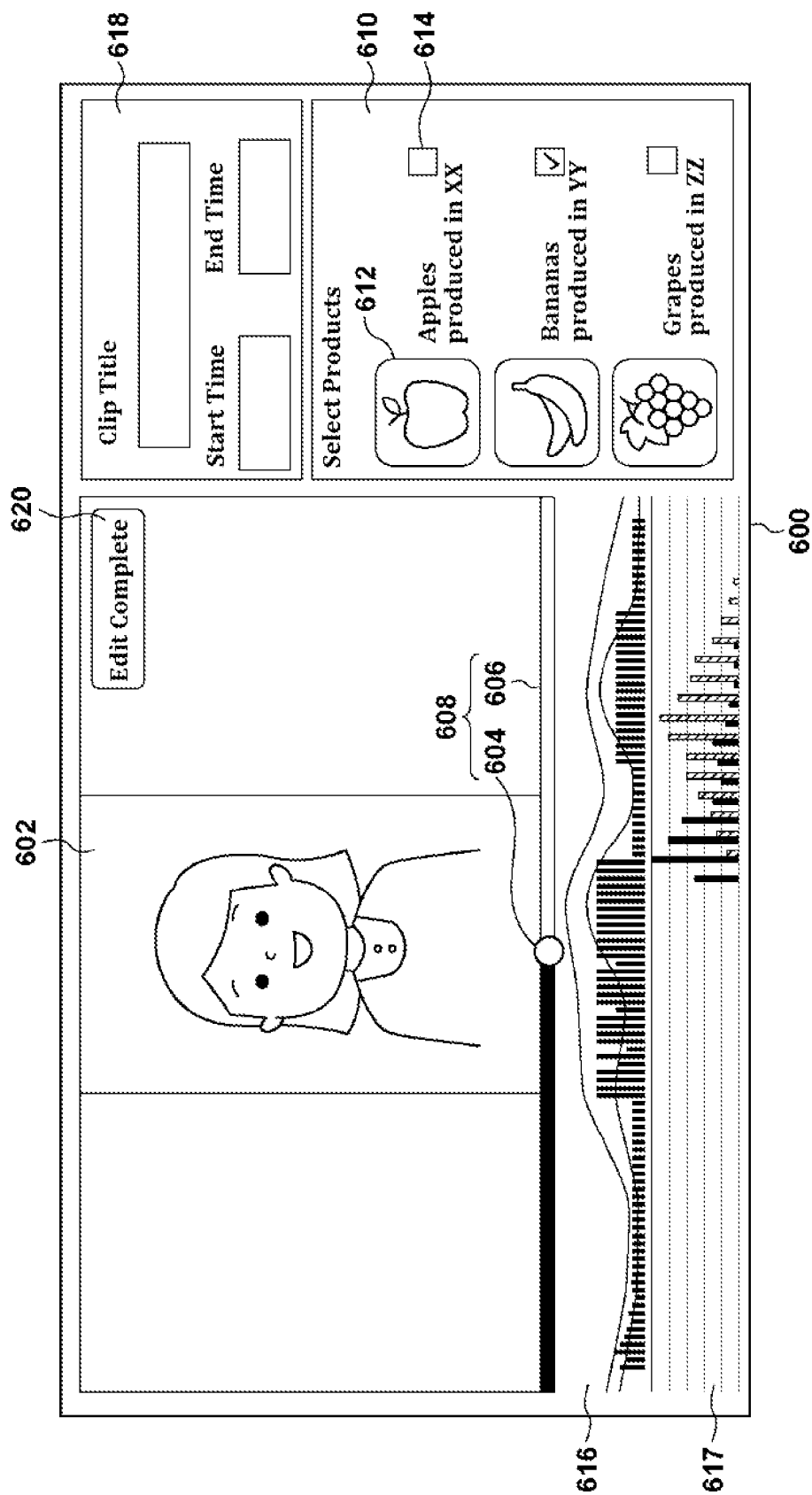
FIG. 8 is a representative view of the editing screen shown on a display of the editing terminal when a sales target is selected.

FIG. 8 is a representative view of the edit screen 600 shown on the display of the editing terminal 2 when a selling item has been selected. In the edit screen 600 of FIG. 7, upon click on the check box corresponding to the "bananas produced in YY" in the product selection area 610 by the editor 8, the edit screen 600 of FIG. 8 is displayed. When the input receiving unit 106 detects the click on the check box corresponding to the "bananas produced in YY" in the product selection area 610, the "bananas produced in YY" is specified as the selected selling item. The display control unit 102 obtains the time-series data of the number of the selling item in the cart and the time-series data of the number of the related comments of the specified selling item "bananas produced in YY" from the editorial data. The display control unit 102 displays the time variation of the number of the selling item "bananas produced in YY" in the cart based on the obtained the time-series data of the number of the selling item in the cart in the form of the line or bar chart in the second time variation display area 617. The display control unit 102 displays in the second time variation display area 617 the time variation of the number of related comments for the selling item "bananas produced in YY" based on the obtained the time-series data of the number of the related comments in the form of the line or bar graph. As described above, the second time variation display area 617 displays the time variation of the parameters related to the selected selling item when the selling item has been selected in the product selection area 610.

In the example of FIG. 8, the black bars represent the number of related comments, and the hatched bars represent the number of the selling item in the cart. In the example of FIG. 8, when the "bananas produced in YY" are showcased in the LC live-stream, the number of comments related to the bananas produced in YY made by viewers increases first, then the number of the bananas produced in YY placed in the cart increases. By looking at the second time variation display area 617, the editor 8 can more quickly and easily see at what point in the LC live-stream the showcase of the bananas produced in YY began, where the live-commerce became active, and when the showcase ended. In addition, by looking at the second time variation display area 617, the editor 8 can "guess" the start and end times of a clip video for the bananas produced in YY. In this way, the efficiency of editing work is improved.

The example of FIG. 8 illustrates the case where only the "bananas produced in YY" is selected in the product selection area 610, but other different selling items may be further selected. In such a case, the second time variation display area 617 displays the time variation of the parameters for each of the selected multiple selling items. In the second time variation display area 617, the form in which the time variation of one selling item is displayed is different from the form in which the time variation of other selling item(s) is displayed. For example, when a check box corresponding to "grapes produced in ZZ" has been selected in the product selection area 610 of the edit screen 600 in FIG. 8, the second time variation display area 617 displays the time variation of the number of the selling item "grapes produced in ZZ" in the cart at the same time as that for the selling item "bananas produced in YY". However, the display style or format (color, hatching, etc.) of the two is different from each other. This enables the editor 8 to check the time variation of the parameters for multiple selling items at the same time. Furthermore, the number of the selling item in the cart and the number of related comments can be compared among the multiple selling items.

Figure 9:
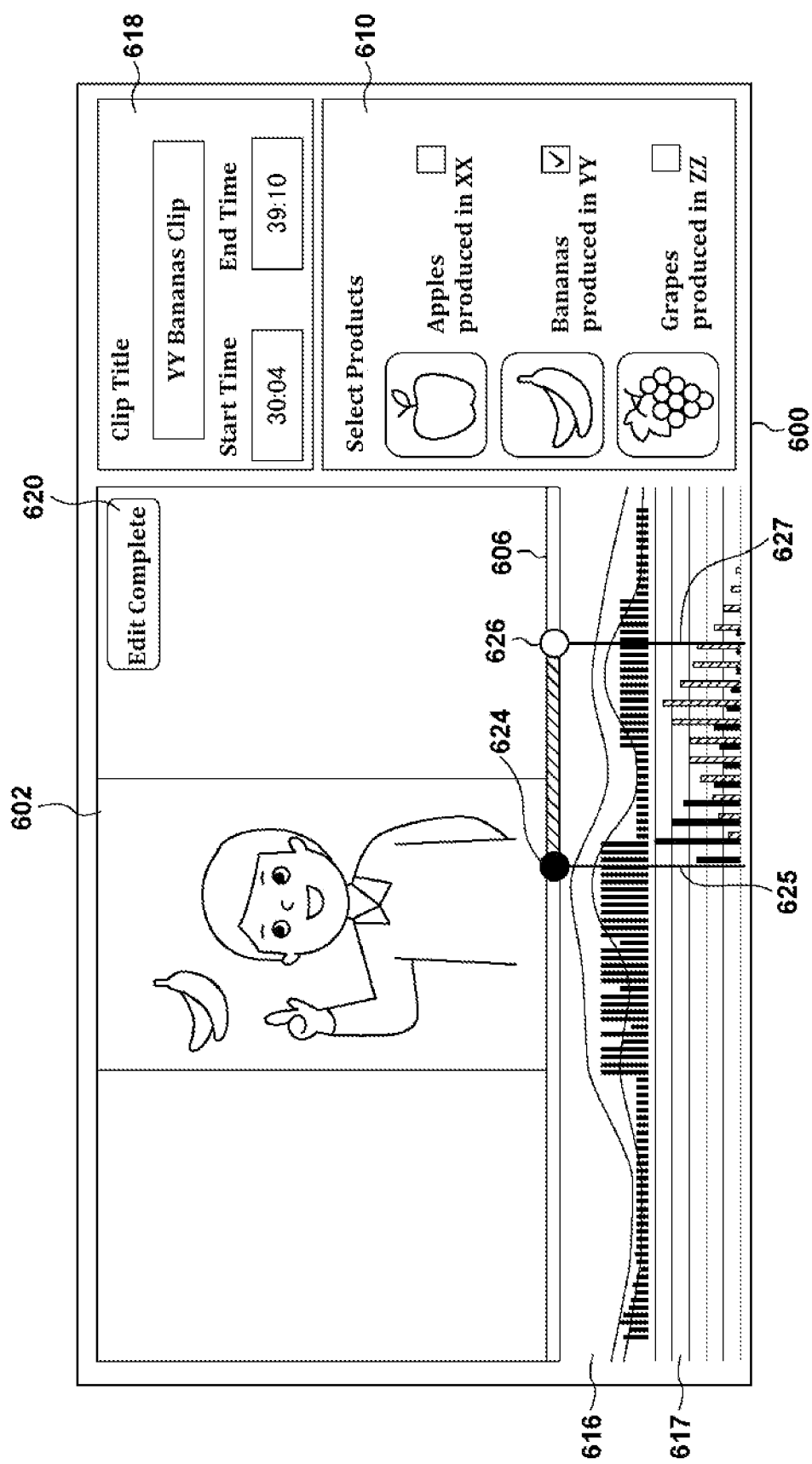
FIG. 9 is a representative view of an edit screen shown on a display of the editing terminal.

FIG. 9 is a representative screen image of the edit screen 600 shown on the display of the editing terminal 2 when a clip segment is selected. In the edit screen 600 of FIG. 8, once the editor 8 specifies the start time of the clip video in the input area of the information input area 618 or by using the thumb object 604, and likewise specifies the end time, the edit screen 600 of FIG. 9 is displayed.

A start time thumb object 624 on the bar object 606 indicates the position of the start time of the clip video generated as a result of the edit. The start time corresponding to the position of the start time thumb object 624 is displayed in the start time input area of the information input area 618. The editor 8 is able to adjust the start time by sliding the start time thumb object 624 or by directly entering the desired time in the start time input area of the information input area 618. The start time thumb object 624 includes a bar object 625 extending into the first time variation display area 616 and the second time variation display area 617. This bar object 625 indicates the position of the start time in the first time variation display area 616 and the second time variation display area 617.

The end time thumb object 626 on the bar object 606 indicates the position of the end time of the clip video generated as the result of the edit. The end time corresponding to the position of the end time thumb object 626 is displayed in the end time input area of the information input area 618. The editor 8 can adjust the end time by sliding the end time thumb object 626 or by directly entering the desired time in the end time input area of the information input area 618. The end time thumb object 626 has a bar object 627 extending into the first time variation display area 616 and the second time variation display area 617. This bar object 627 indicates the position of the end time in the first time variation display area 616 and the second time variation display area 617.

Upon detection of a click or tap on the edit complete button 620 by the input receiving unit 106, the input receiving unit 106 starts generating the edit result data. The communication unit 104 includes, in the edit result data, the title, start time, and end time entered in the information input area 618. The communication unit 104 includes, in the edit result data, the selling item ID(s) of the selling item(s) selected in the product selection area 610. The communication unit 104 transmits the generated edit result data to the LC server 4 over the network 6. At the LC server 4, a clip video is generated based on the title, start time, and end time included in the edit result data, and the selling item specified by the selling item ID also included in the edit result data is associated with that clip video.

Figure 10:
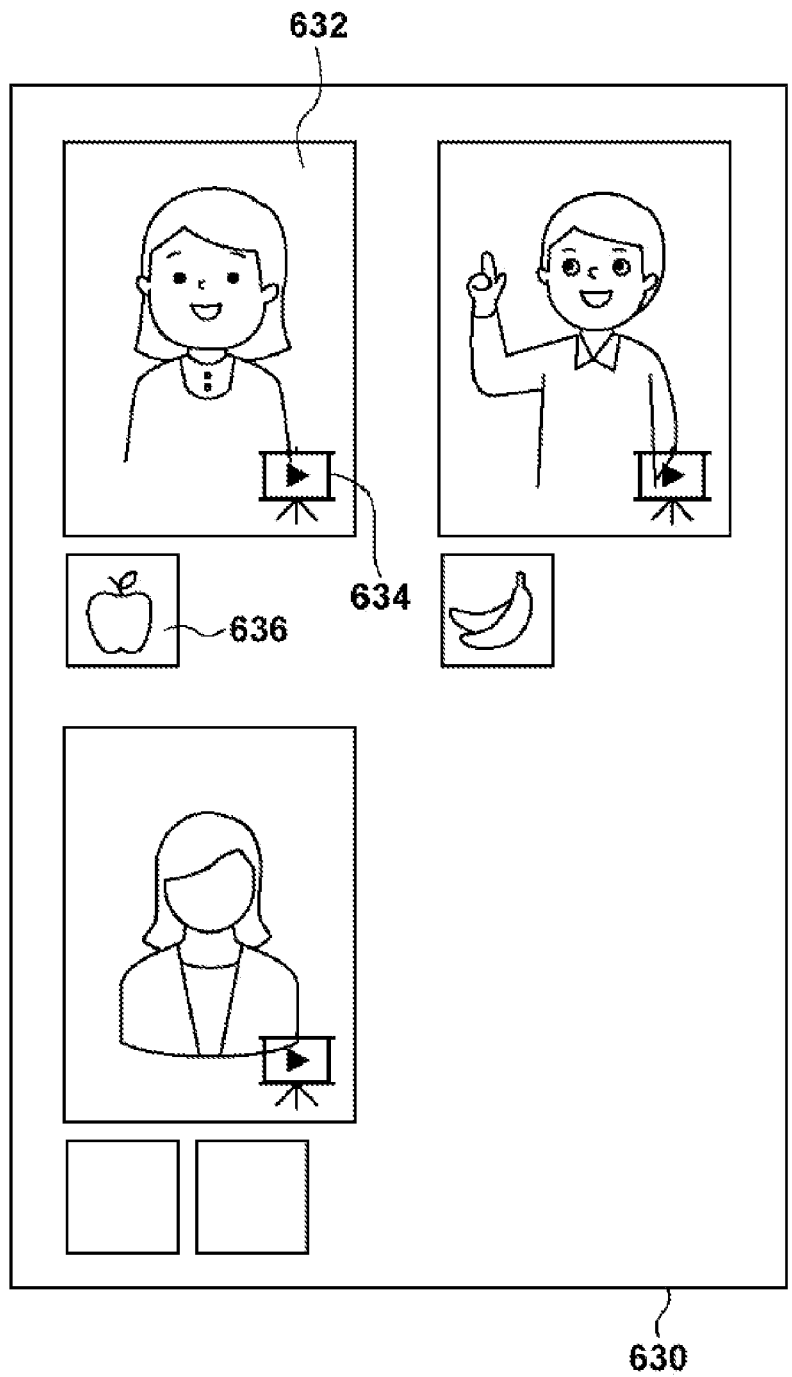
FIG. 10 is a representative view of a clip video selection screen shown on a display of a user terminal that requested a list of clip videos from the LC server.

FIG. 10 is a representative screen shot of a clip video selection screen 630 shown on the display of the user terminal that requested a list of clip videos from the LC server 4. Upon reception of a request from a user terminal over the network 6 by the edited video providing unit 210, the edited video providing unit 210 generates a list of edited clip videos that can be provided by referring to the edited video DB 215. The edited video providing unit 210 transmits the generated list to the requesting user terminal over the network 6. The user terminal generates the clip video selection screen 630 based on the received list and shows the screen on the display.

The clip video selection screen 630 includes, for each of the edited clip videos in the received list, a cover image 632, a play button 634, and an icon 636 of the selling item associated with the edited clip video. On the clip video selection screen 630, the user taps the cover image 632 of the edited clip video that the user wishes to view. The user terminal generates a viewing request that includes information specifying the edited clip video corresponding to the tapped cover image 632 and transmits the request to the LC server 4 over the network 6. The edited video providing unit 210 obtains, from the edited video DB 215, the data of the edited clip video specified by the information in the received viewing request, and transmit the data to the requesting user terminal over the network 6. The user terminal reproduces the received data to display the edited clip video on its display.

Figure 11:
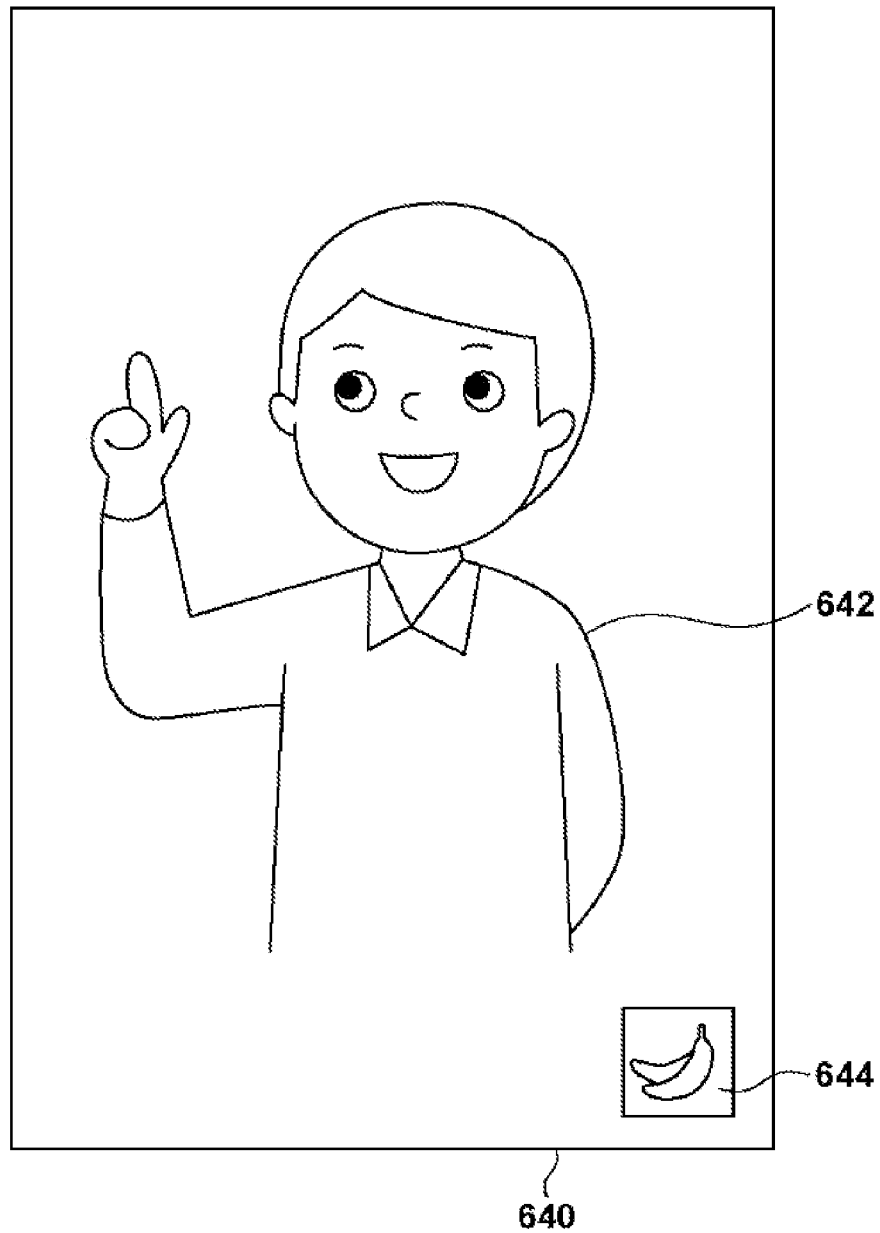
FIG. 11 is a representative view of the clip video playback screen shown on the display of the user terminal.

FIG. 11 is a representative view of a clip video playback screen 640 shown on the display of the user terminal. The clip video playback screen 640 includes a clip video display area 642 that displays the edited clip video by reproducing the data received from the LC server 4, and an icon 644 of the selling item associated with the edited clip video. When the user terminal detects a click or tap on the selling item icon 644, it performs a process to place in the cart (cart-in) the selling item corresponding to the icon 644.

In the above embodiment, an example of a holding unit includes a hard disk or semiconductor memory. It is understood by those skilled in the art that each element or component can be realized by a CPU not shown, a module of an installed application program, a module of a system program, or a semiconductor memory that temporarily stores the contents of data read from a hard disk, and the like.

With the live commerce system 1, the editor 8 is able to select a desired selling item(s) in the product selection area 610 on the edit screen 600 to generate an edited video for the selected selling item(s) from the archive. The edited video is associated with the selected selling item(s). This makes it easier and more intuitive to generate an edited video for a desired selling item(s) from an archive of an LC live-stream in which a plurality of selling items are sold. In this way, the editor 8 will feel more convenient to edit.

In the live commerce system 1, when the editor 8 selects a desired selling item in the product selection area 610 on the edit screen 600, the time variation of the parameters related to the selected selling item in the LC live-stream are displayed in the second time variation display area 617. This allows the editor 8 to more efficiently find the portion to be cut out by referring to the displayed time variation information.

Figure 12:
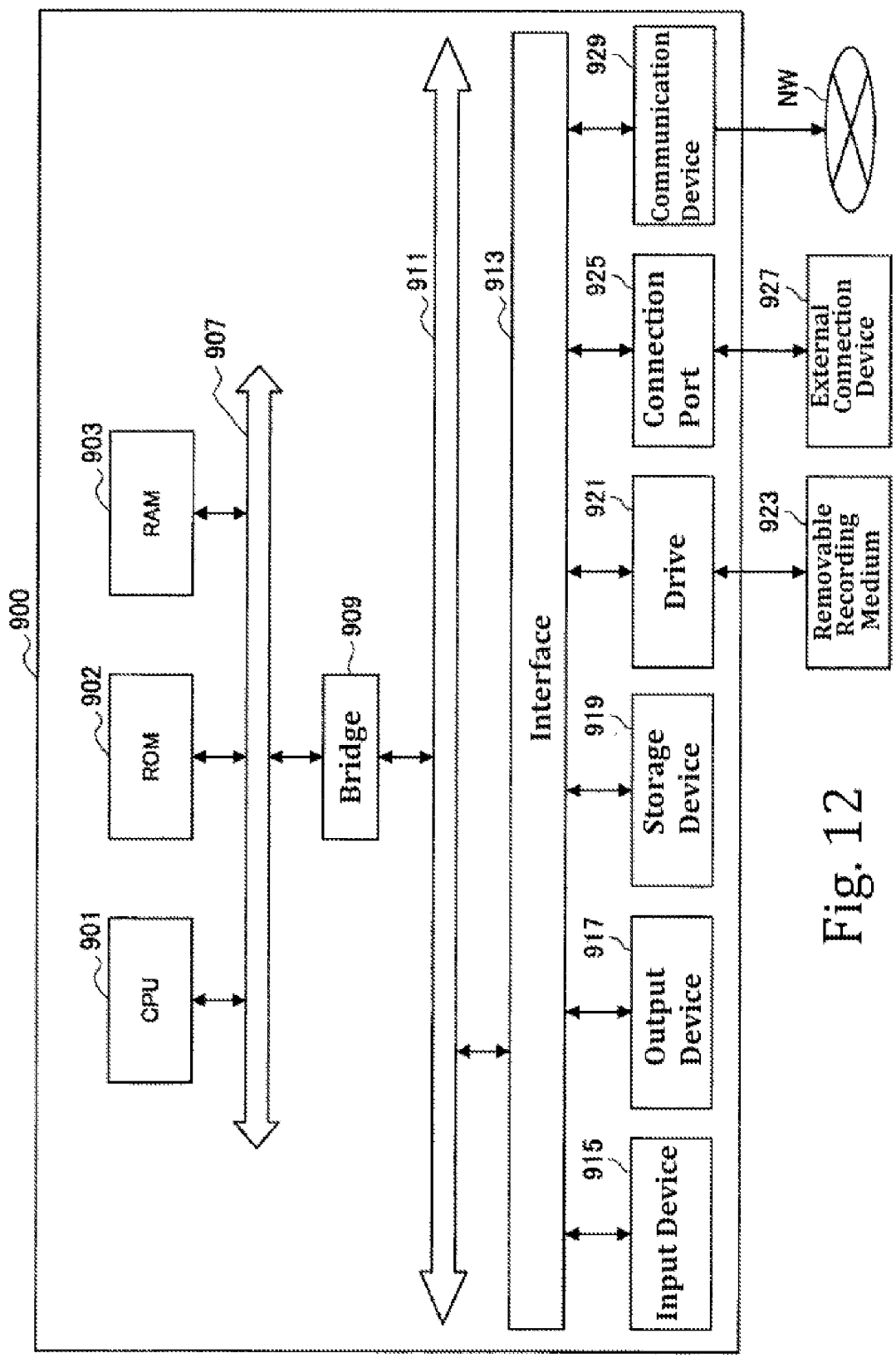
FIG. 12 is a block diagram showing an example of the hardware configuration of an information processing device according to an embodiment.

Referring to FIG. 12, the hardware configuration of an information processing device relating to an embodiment of the disclosure will be now described. FIG. 12 is a block diagram showing an example of the hardware configuration of the information processing device according to the embodiment. The illustrated information processing device 900 may, for example, realize the LC server 4 and the editing terminal 2 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a processing circuit such as a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 902, the RAM 903, the storage device 919, or a removable recording medium 923. For example, the CPU 901 controls the overall operation of each functional unit included in the server 10 and the user terminals 20 and 30 in the embodiment. The ROM 902 stores programs including sets of instructions, calculation parameters, and the like used by the CPU 901. The RAM 903 serves as a primary storage that stores programs including sets of instructions to be used in the execution of the CPU 901, parameters that appropriately change in the execution, and the like. The CPU 901, ROM 902, and RAM 903 are interconnected to each other by the host bus 907 which may be an internal bus such as a CPU bus. Further, the host bus 907 is connected to the external bus 911 such as a PCI (Peripheral Component Interconnect/Interface) bus via the bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing device 900 as text, video such as images, or sound such as audio.

The storage device 919 is a device for storing data configured as an example of a storage unit of the information processing device 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for the removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is, for example, a camera for capturing an image of the real space to generate the captured image. The image capturing device uses an imaging element such as a CCD (Charge Coupled Device) or CMOS (Complementary Metal Oxide Semiconductor) and various elements such as lenses that are provided to control image formation of a subject on the imaging element. The image capturing device may capture a still image or may capture a moving image.

The configuration and operation of the live commerce system 1 in the embodiment have been described. This embodiment is merely an example, and it will be understood by those skilled in the art that various modifications are possible by combining the respective components and processes, and that such modifications are also within the scope of the present disclosure.

Has been described is the case in which the number of the selling item in the cart and the number of related comments are employed as the parameters related to the selling item selected in the product selection area 610 is described, however the parameters related to the selling item selected in the product selection area 610 are not limited to these. For example, the parameters may be the number of actions taken to order the selected selling item during the LC live-stream, or the number of comments related to the selling item, or both. For example, the parameter may be the number of sales of the selected selling item during the LC live-stream. Alternatively, the parameter related to the selling item selected in the product selection area 610 may also be the number of actions performed to order the selected selling item during the archive in lieu of or in addition to the LC live-stream or the number of comments regarding the selling item, or both. For example, the number of the selling item placed in the cart during the LC live-stream and the number of the selling item placed in the cart during the replay of the archive may be combined.

In the above embodiment, the case in which time-series data of the number of the selling item in the cart is generated from the cart data indicating what, when, and how many items were placed in the cart, which is generated when the selling item is placed in the cart during the LC live-stream, has been described. However, it is not limited to this case. For example, the LC server 4 may periodically access the cart during the LC live-stream and obtain data on what and how many items are in the cart.

The procedures described herein, particularly those described with a flow diagram, a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present invention.

At least some of the functions realized by the LC server 4 may be realized by a device(s) other than the LC server 4, for example, the editing terminal 2. At least some of the functions realized by the editing terminal 2 may be realized by a device(s) other than the editing terminal 2, for example, the LC server 4.

What is claimed is:

1. A terminal, comprising:
one or more processors; and
memory storing one or more computer programs configured to be executed by the one or more processors,
the one or more computer programs including instructions for:
displaying an edit screen on a display, the edit screen including a first area that displays a video obtained by playing back an archive of a live-stream associated with a plurality of selling items, an object that indicates a current playback position of the video, and a second area that selectably displays the plurality of selling items associated with the live-stream; and
communicating with a server over a network so that a result of edits made through the edit screen is associated with a selling item selected in the second area,
wherein the edit screen further includes a third area that is displayed in associated with the object and displays a time variation of a parameter related to the live-stream, and
wherein, when a selling item is selected in the second area, the third area displays a time variation of a parameter related to the selected selling item.

2. The terminal of claim 1, wherein the parameter related to the selected selling item is a number of actions performed to order the selected selling item during the live-stream or a number of comments regarding the selling item, or both.

3. The terminal of claim 1, wherein when no selling items are selected in the second area, the third area displays a time variation of a parameter independent of the selling items.

4. A method, comprising:
displaying an edit screen on a display, the edit screen including a first area that displays a video obtained by playing back an archive of a live-stream associated with a plurality of selling items, an object that indicates a current playback position of the video, and a second area that selectably displays the plurality of selling items associated with the live-stream; and
communicating with a server over a network so that a result of edits made through the edit screen is associated with a selling item selected in the second area,
wherein the edit screen further includes a third area that is associated with the object and displays a time variation of a parameter related to the live-stream,
wherein, when a selling item is selected in the second area, the third area displays a time variation of a parameter related to the selected selling item.

5. The method of claim 2, wherein the parameter related to the selected selling item is a number of actions performed to order the selected selling item during the live-stream or a number of comments regarding the selling item, or both.

6. The terminal of claim 4, wherein when no selling items are selected in the second area, the third area displays a time variation of a parameter independent of the selling items.

* * * * *